(No Model.)
S. M. WINDMILLER & L. HOLFORD.
GEARING FOR WASHING MACHINES.
No. 568,824.        Patented Oct. 6, 1896.
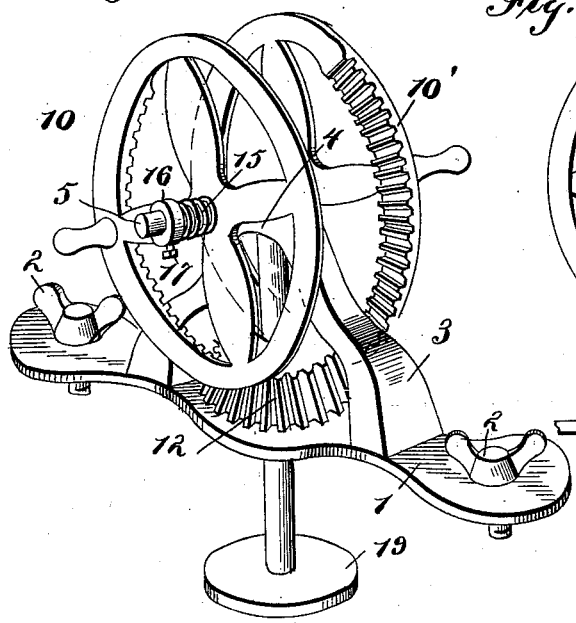
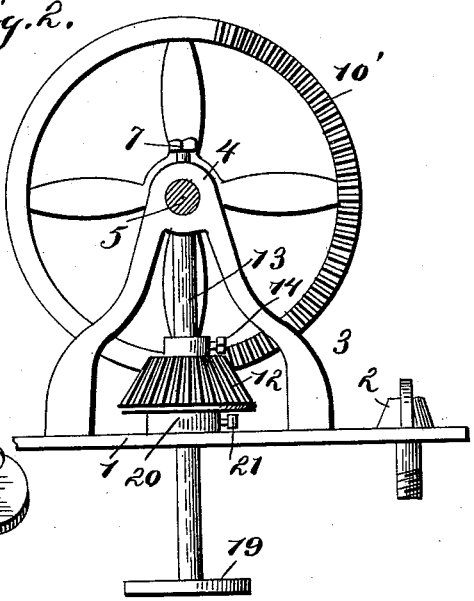
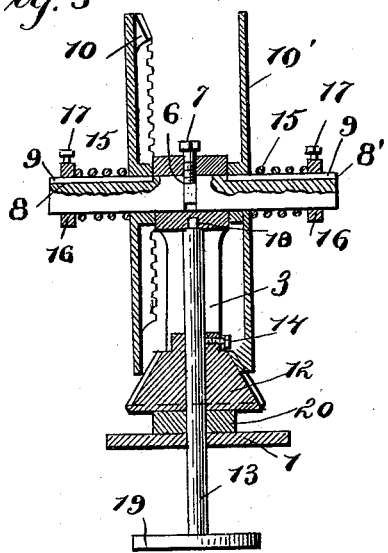
Witnesses
Inventors
Samuel M. Windmiller
Lee Holford
By   Willson
Attorney

UNITED STATES PATENT OFFICE.

SAMUEL M. WINDMILLER AND LEE HOLFORD, OF NEBO, ILLINOIS.

GEARING FOR WASHING-MACHINES.

SPECIFICATION forming part of Letters Patent No. 568,824, dated October 6, 1896.

Application filed May 27, 1896. Serial No. 593,315. (No model.)

*To all whom it may concern:*

Be it known that we, SAMUEL M. WINDMILLER and LEE HOLFORD, citizens of the United States, residing at Nebo, in the county of Pike and State of Illinois, have invented certain new and useful Improvements in Gearing for Washing-Machines; and we do declare the following to be a full, clear, and exact description of the invention, such as will enable others skilled in the art to which it appertains to make and use the same.

This invention has relation to improvements in gearing for washing-machines, churns, and similar devices, and the object is to provide a durable and efficient gearing for this purpose.

To this end the novelty consists in the construction, combination, and arrangement of the same, as will be hereinafter more fully described, and particularly pointed out in the claim.

In the accompanying drawings the same figures of reference indicate the same parts of the invention.

Figure 1 is a perspective view of our improved gearing. Fig. 2 is a sectional side elevation of the same, and Fig. 3 is a longitudinal section.

1 represents the base-plate, which may be detachably secured to the washing-machine by thumb-screws 2 2.

3 3 are integral arms on the base 1, and their upper ends are joined to form an integral bearing-block 4, in which is journaled the horizontal shaft 5, which is formed with a central circumferential groove 6, into which projects the end of a set-screw 7, secured in the bearing-block 4, which allows the said shaft to rotate freely, but prevents any end movement thereof. The outer ends of this shaft are provided with keyways 8 and 8', respectively, into each of which projects a key 9 on the mutilated gear-wheels 10 10', which are mounted on the ends of said shaft on each side of the bearing-block 4, so as to rotate the shaft and travel in unison.

On the outside of each of the gear-wheels 10 10' is a spiral spring 15, encompassing the shaft, the inner ends of said springs being held in contact with the wheels by collars 16, secured on said shaft by set-screws 17.

A bevel-pinion 12 is secured to a vertical shaft 13 by a set-screw 14, the upper end of said shaft being journaled in a bearing 18 in the block 4, and below the pinion 12 is a collar 20, secured to the shaft 13 by a set-screw 21, the collar forming a bearing for said shaft on the base-plate 1, and the lower end of the shaft is provided with a disk 19, to which is connected the machine to be operated.

The teeth on the mutilated gear-wheels 10 10' mesh with the pinion 12, so that when the shaft 5 is rotated the gear-wheels 10 10' alternately rotate the pinion 12 and shaft 13 first in one direction and then in the other.

Having thus fully described our invention, what we claim as new and useful, and desire to secure by Letters Patent of the United States, is—

A gearing for washing-machines, comprising the base-plate 1, the integral arms 3 3 joined at their top to form an integral bearing-block 4, the set-screw 7, the horizontal shaft 5 journaled in said bearing-block and provided with the circumferential groove 6 and the longitudinal keyways 8 8', keys 9 9, the mutilated gear-wheels 10 10', the springs 15, and the collars 16 mounted on said horizontal shaft 5, in combination with the vertical shaft 13 journaled in the bearing 18 in the block 4, and the bevel-pinion 12 secured on said shaft by a set-screw and alternately meshing with the mutilated gear-wheels 10 10', substantially as and for the purpose set forth.

In testimony whereof we hereunto affix our signatures in presence of two witnesses.

SAMUEL M. WINDMILLER.
LEE HOLFORD.

Witnesses:
C. H. BUSH,
G. O. CROMWELL.